United States Patent [19]

Kato

[11] Patent Number: 5,010,546

[45] Date of Patent: Apr. 23, 1991

[54] PACKET SWITCHING SYSTEM

[75] Inventor: Masaaki Kato, Kasugai, Japan

[73] Assignee: Fujitsu Limited, Kawasaki, Japan

[21] Appl. No.: 366,485

[22] Filed: Jun. 15, 1989

[30] Foreign Application Priority Data

Jun. 20, 1988 [JP] Japan .................................. 63-151865

[51] Int. Cl.$^5$ .............................................. H04J 3/26
[52] U.S. Cl. .................... 370/85.11; 370/94.1
[58] Field of Search ...................... 370/60, 85.9, 85.11, 370/92, 94.1

[56] References Cited

U.S. PATENT DOCUMENTS

| | | |
|---|---|---|
| 4,549,219 | 10/1985 | Sue et al. ............................ 370/94.1 |
| 4,799,215 | 1/1989 | Suzuki ................................. 370/94.1 |

Primary Examiner—Douglas W. Olms
Assistant Examiner—Melvin Marcelo
Attorney, Agent, or Firm—Staas & Halsey

[57] ABSTRACT

A packet switching system has at least first and second packet level control devices and first and second frame level control devices. When a data packet is received at the first frame level control device via a communication line which is connected thereto, the first frame level control device disassembles the data packet and transfers only a header portion of the data packet to the first packet level control device, thereby a data portion of the data packet being transferred directly to the second frame level control device. The second frame level control device assembles the data portion received from the first frame level control device and the corresponding header portion received via the first and second packet level control devices, and transmits the assembled data packet on a communication line which is connected to the second frame level control device.

14 Claims, 10 Drawing Sheets

PACKET SWITCHING SYSTEM

BACKGROUND OF THE INVENTION

The present invention generally relates to packet switching systems, and more particularly to a packet switching system with a rationalized data transfer capability.

With the recent spread of packet communication, a data quantity which can be transferred by a packet exchange in one packet is increasing from 1024 octets to 4096 octets, for example. In this case, from the point of view of reducing a transfer time of the packets, it is desirable to minimize transfers of packets having a large data quantity within the packet exchange.

FIG. 1 shows an example of a conventional packet exchange. In FIG. 1, the packet exchange has a plurality of frame level control devices $2_1$ through $2_n$, a plurality of packet level control devices $3_1$ through $3_n$ which are respectively connected to the frame level control devices $2_1$ through $2_n$, a system operation management device 4, and a bus 5 which connects the packet level control devices $3_1$ through $3_n$. A frame level control device $2_i$ is connected to communication lines $1_{i1}$ through $1_{im}$, where $i=1, 2, \ldots, n$.

For example, an information frame I(CR) including a call out request packet CR for making a call set up is received via the communication line $1_{11}$ which is connected to the frame level control device $2_1$. In this case, the frame level control device $2_1$ stores the received information frame I(CR) into a memory $2_{1b}$ and carries out a known frame level control. Then, the frame level control device $2_1$ disassembles the information frame I(CR) to extract the call out request packet CR, and a direct memory access (DMA) controller $2_{1a}$ transfers the call out request packet CR to a memory $3_{1b}$ of the corresponding packet level control device $3_1$.

The packet level control device $3_1$ carries out a known packet level control with respect to the call out request packet CR which is transferred to the memory $3_{1b}$ and makes a call set up. A DMA controller $3_{1a}$ transfers the call out request packet CR via the bus 5 to a memory $3_{2b}$ of the packet level control device $3_2$ which is connected to a destination communication line $1_{21}$ in this case.

The packet level control device $3_2$ carries out a known packet level control with respect to the call out request packet CR which is transferred to the memory $3_{2b}$ and makes a call set up. A DMA controller $3_{2a}$ transfers the call out request packet CR to a memory $2_{2b}$ of the frame level control device $2_2$ which is connected to the communication line $1_{21}$.

The frame level control device $2_2$ assembles the information frame I(CR) including the call out request packet CR stored in the memory $2_{2b}$ and transmits the information frame I(CR) on the destination communication line $2_{21}$.

By the above described process, a call set up is made between the frame level control device $2_1$ which is connected to the communication line $1_{11}$ and the frame level control device $2_2$ which is connected to the communication line $1_{21}$, via the packet level control devices $3_1$ and $3_2$.

Thereafter, when an information frame I(DT) including a data packet DT is received at the communication line $1_{11}$, the data packet DT is transferred from the frame level control device $2_1$ to the frame level control device $2_2$ via the packet level control devices $3_1$ and $3_2$ in accordance with the set call. The frame level control device $2_2$ assembles the information frame I(DT) including the data packet DT and transmits the information frame I(DT) on the communication line $2_{21}$.

According to the conventional packet exchange, the call out request packet CR and the data packet DT received at the communication line $1_{11}$ are transferred from the frame level control device $2_1$ to the packet level control device $3_1$, then from the packet level control device $3_1$ to the packet level control device $3_2$ via the bus 5, and further from the packet level control device $3_2$ to the frame level control device $2_2$. Finally, the call out request packet CR and the data packet DT are transferred from the frame level control device $2_2$ to the communication line $2_{11}$. Therefore, when transferring the call out request packet CR and the data packet DT from the frame level control device $2_1$ to the frame level control device $2_2$, three transfers must be made within the packet exchange. As a result, there is a problem in that it takes a long time to complete the transfer especially when the data packet DT includes a large data quantity. In addition, there is a problem in that the time required to complete the transfer within the packet exchange may exceed a tolerable packet transfer delay time within the packet exchange.

SUMMARY OF THE INVENTION

Accordingly, it is a general object of the present invention to provide a novel and useful packet switching system in which the problems described above are eliminated.

Another and more specific object of the present invention is to provide a packet switching system comprising a plurality of communication lines, at least first and second data control means respectively connected to first and second groups of the communication lines, at least first and second packet control means respectively connected to the first and second data control means, a first bus connecting the first and second packet control means, and a second bus connecting the first and second data control means, where the first and second data control means have identical construction and each comprise packet discriminating means for discriminating a type of packet received, packet disassembling/assembling means for disassembling a data packet into a header portion and a data portion and for assembling the disassembled header portion and data portion into the data packet, and data transfer means for controlling transfer of packets. In the first data control means the packet discriminating means discriminates the type of packet received from a communication line within the first group of communication lines which is connected to the first data control means, the packet disassembling/assembling means disassembles the received packet into a header portion and a data portion when the packet discriminating means discriminates the received packet as being a data packet, and the data transfer means transfers the header portion to the first packet control means and the data portion to the second data control means via the second bus. The first packet control means transfers the header portion to the second packet control means via the first bus, and the second packet control means transfers the header portion to the second data control means. In the second data control means the packet disassembling/assembling means assembles the header portion received from the second packet control means and the data portion received via the second bus into the data packet, and the data transfer means transfers the assembled data packet on a communication line within the second group of communication lines which is connected to the second data control means. According to the packet switching system of the present invention, it is possible to considerably reduce the number of transfers within the packet exchange and thus considerably reduce the transfer time required to transfer the packets.

Other objects and further features of the present invention will be apparent from the following detailed description when read in conjunction with the accompanying drawings.

DESCRIPTION OF THE PREFERRED EMBODIMENTS

Figure 2:
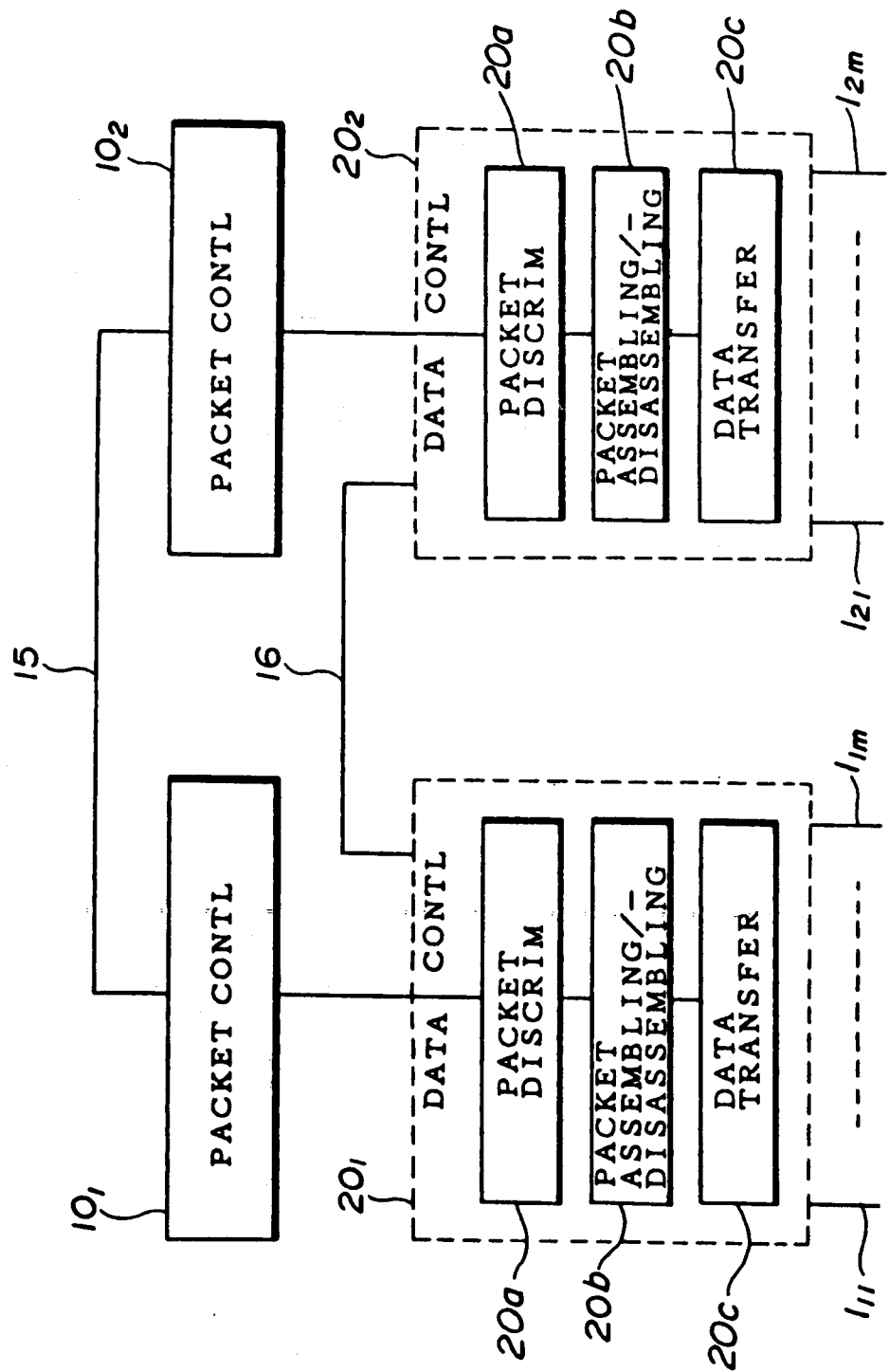
FIG. 2 is a system block diagram generally showing a packet switching system according to the present invention for explaining an operating principle thereof.

First, a description will be given of an operating principle of a packet switching system according to the present invention, by referring to FIG. 2 which generally shows the packet switching system according to the present invention. In FIG. 2, packet control means $10_1$ and $10_2$ are connected by a bus 15. Data control means $20_1$ and $20_2$ are connected to the corresponding packet control means $10_1$ and $10_2$. A bus 16 connects the data control means $20_1$ and $20_2$. Each of the data control means $20_1$ and $20_2$ have a packet discriminating means $20a$, a packet disassembling/assembling means $20b$, and a data transfer means $20c$. The data control means $20_1$ and $20_2$ are connected to respective groups of communication lines $1_{11}$ through $1_{1m}$ and $1_{21}$ through $1_{2m}$.

When it is assumed for the sake of convenience that the data control means $20_1$ is connected to a source communication line $1_{11}$ which is connected to a source packet mode terminal (not shown), the packet discriminating means $20a$ of the data control means $20_1$ discriminates the type of packet received from the communication line $1_{11}$. The packet disassembling/assembling means $20b$ of the data control means $20_1$ disassembles a data packet discriminated by the packet discriminating means $20a$ into a packet header portion and a data portion. The data transfer means $20c$ of the data control means $20_1$ transfers the header portion which is disassembled in the disassembling/assembling means $20b$ to the packet control means $10_1$ and transfers the data portion which is disassembled in the disassembling/assembling means $20b$ via the bus 16 to the data control means $20_2$ which is the destination side. The data control means $20_2$ is connected to a destination communication line $1_{21}$ which is connected to a destination packet mode terminal (not shown).

The packet control means $10_1$ transfers via the bus 15 the header portion and packets other than the data packet which are received from the data control means $20_1$ to the packet control means $10_2$. The packet control means $10_2$ transfers the header portion and the packets other than the data packet to the data control means $20_2$. In the data control means $20_2$, the packet discriminating means $20a$ discriminates the type of packet received, and the packet disassembling/assembling means $20b$ assembles the data packet based on the header portion received from the packet control means $10_2$ with the corresponding data portion received via the bus 16. The assembled data packet is transferred from the data transfer means $20c$ of the data control means $20_2$ to the communication line $1_{21}$.

Accordingly, the data portion of the data packet is transferred directly from the data control means $20_1$ to the control means $20_2$, without being transferred via the packet control means $10_1$ and $10_2$. For this reason, a number of transfers within the packet exchange is considerably reduced compared to the conventional case. Even when the data quantity of the data packet is large, it is possible to considerably reduce the time required to transfer the packets within the packet exchange.

Figure 1:
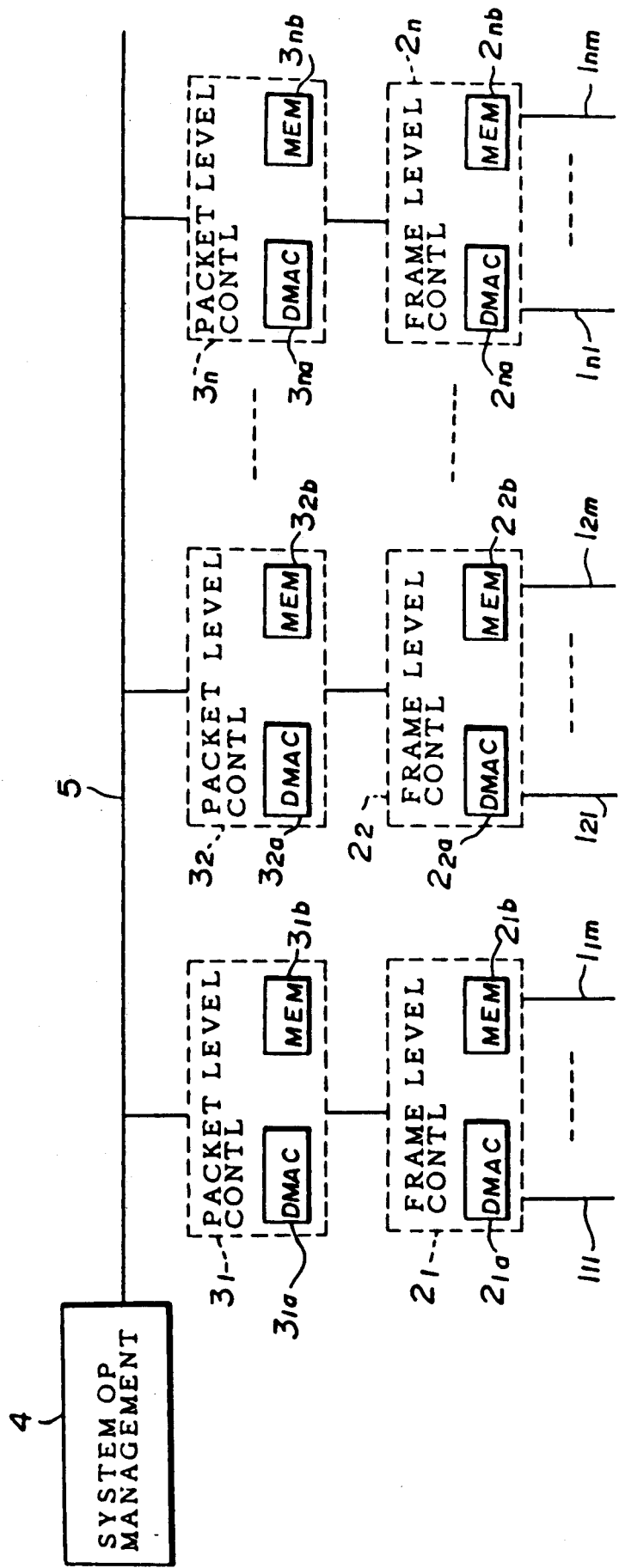
FIG. 1 is a system block diagram showing an example of a conventional packet exchange.
Figure 3:
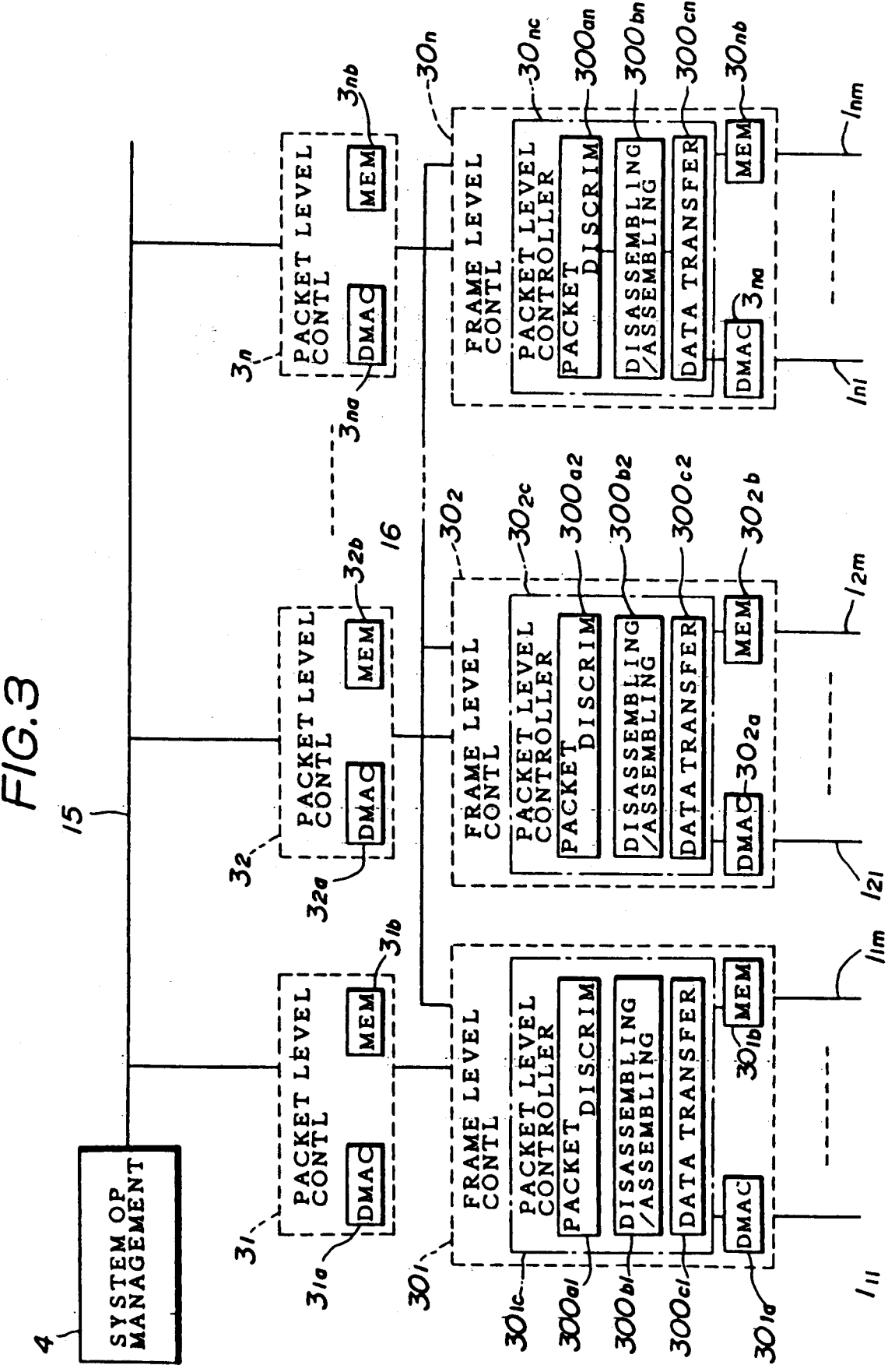
FIG. 3 is a system block diagram showing a first embodiment of the packet switching system according to the present invention.
Figure 4:
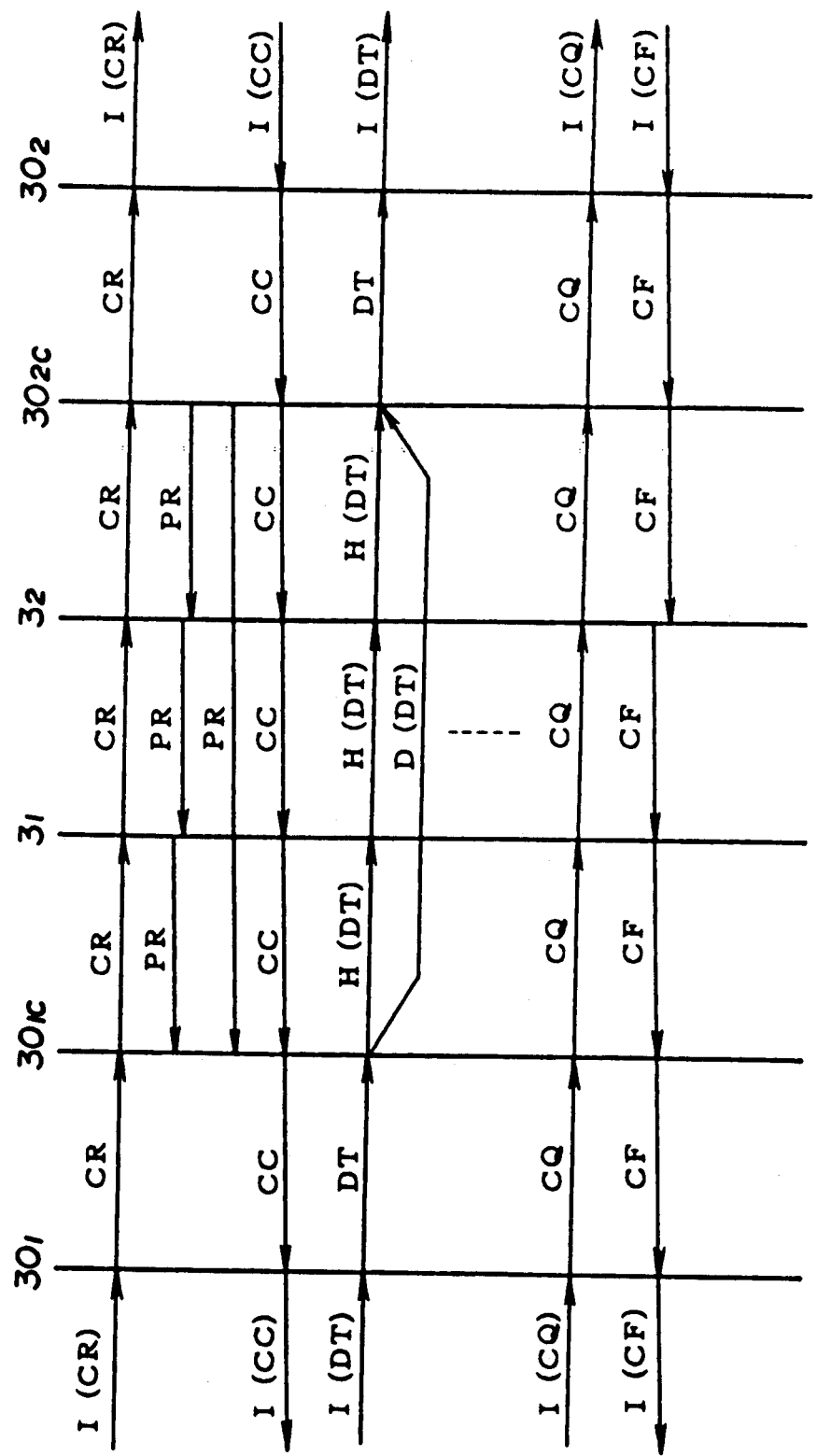
FIG. 4 is a time chart for explaining an operation of the first embodiment.

Next, a description will be given of a first embodiment of the packet switching system according to the present invention, by referring to FIGS. 3 and 4. FIG. 3 shows the first embodiment, and FIG. 4 is a time chart for explaining an operation of the first embodiment. In FIG. 3, those parts which are the substantially the same as those corresponding parts in FIGS. 1 and 2 are designated by the same reference numerals, and a description thereof will be omitted.

In FIG. 3, the packet exchange has a plurality of frame level control devices $30_1$ through $30_n$, a plurality of packet level control devices $3_1$ through $3_n$ which are respectively connected to the frame level control devices $30_1$ through $30_n$, a system operation management device 4, a bus 15 which connects the packet level control devices $3_1$ through $3_n$, and a bus 16 which connects the frame level control devices $30_1$ through $30_n$. A frame level control device $30_i$ is connected to communication lines $1_{i1}$ through $1_{im}$, where $i = 1, 2, \ldots, n$.

A frame level control device $30_i$ has a DMA controller $30_{ia}$, a memory $30_{ib}$, and a packet level controller $30_{ic}$, where $i = 1, 2, \ldots, n$. The packet level controller $30_{ic}$ includes a packet discriminating part 300ai, a disassembling/assembling part 300bi, and a data transfer part 300ci, where $i = 1, 2, \ldots, n$.

For example, an information frame I(CR) including a call out request packet CR for making a call set up is received via the communication line $1_{11}$ which is connected to the frame level control device $30_1$. In this case, the frame level control device $30_1$ stores the received information frame I(CR) into a memory $30_{1b}$ and carries out a known frame level control. Then, the frame level control device $30_1$ disassembles the information frame I(CR) to extract the call out request packet CR, and the DMA controller $30_{1a}$ transfers the call out request packet CR to the packet level controller $30_{1c}$.

The packet discriminating part 300a1 of the packet level controller $30_{1c}$ discriminates the type of packet received from the memory $30_{1b}$. When the received packet is discriminated as being the call out request packet CR, the DMA controller $30_{1a}$ transfers the call out request packet CR to the memory $3_{1b}$ of the corresponding packet level control device $3_1$.

The packet level control device $3_1$ carries out a known packet level control with respect to the call out request packet CR which is transferred to the memory $3_{1b}$ and makes a call set up. The DMA controller $3_{1a}$ transfers the call out request packet CR via the bus 15 to the memory $3_{2b}$ of the packet level control device $3_2$ which is connected to a destination communication line $1_{21}$. In addition, the packet level control device $3_1$ returns a process identification information PR to the packet level controller $30_{1c}$ of the frame level control device $30_1$.

The packet level control device $3_2$ carries out a known packet level control with respect to the call out request packet CR which is transferred to the memory $3_{2b}$ and makes a call set up. The DMA controller $3_{2a}$ transfers the call out request packet CR to the memory $30_{2b}$ of the frame level control device $30_2$. In addition, the packet level control device $3_2$ returns a process identification information PR to the packet level control device $3_1$.

The frame level control device $30_2$ assembles the information frame I(CR) including the call out request packet CR which is transferred to the memory $30_{2b}$ and transmits the information frame I(CR) on the communication line $1_{21}$. In addition, the frame level control device $30_2$ returns a process identification information PR to the packet level control device $3_2$ and returns a process identification information PR to the frame level control device $30_1$ via the bus 16.

By the above described process, a call set up is made between the frame level control device $30_1$ which is connected to the communication line $1_{11}$ and the frame level control device $30_2$ which is connected to the communication line $1_{21}$, via the packet level control devices $3_1$ and $3_2$.

Thereafter, when an information frame I(CC) including a connection complete packet CC is received at the communication line $1_{21}$, the frame level control device $30_2$ disassembles the information frame I(CC) to extract the connection complete packet CC, and the packet discriminating part 300a2 of the packet level controller $30_{2c}$ discriminates the type of packet received. When the received packet is discriminated as being the connection complete packet CC, the DMA controller $30_{2a}$ transfers the connection complete packet CC to the memory $3_{2b}$ of the corresponding packet level control device $3_2$.

The packet level control device $3_2$ transfers the connection complete packet CC to the packet level control device $3_1$ via the bus 15. The packet level control device $3_1$ transfers the connection complete packet CC to the frame level control device $30_1$. The frame level control device $30_1$ assembles the information frame I(CC) including the connection complete packet CC and transmits the information frame I(CC) on the communication line $1_{11}$.

Thereafter, when an information frame I(DT) including a data packet DT is received at the communication line $1_{11}$, the frame level control device $30_1$ carries out a known frame level control and disassembles the information frame I(DT) to extract the data packet DT. The data packet DT is transferred to the packet level controller $30_{1c}$.

In the packet level controller $30_{1c}$, the packet discriminating part 300a1 discriminates the type of packet. When the packet is discriminated as being the data packet DT, the disassembling/assembling part 300b1 disassembles the data packet DT into a packet header portion H(DT) and a data portion D(DT). The data transfer part 300c1 transfers the packet header portion H(DT) to the memory $3_{1b}$ of the corresponding packet level control device $3_1$, and transfers the data portion D(DT) to the memory $30_{2b}$ of the frame level control device $30_2$ via the bus 16.

The packet level control device $3_1$ carries out a known packet level control with respect to packet header portion H(DT) of the data packet DT which is transferred to the memory $3_{1a}$. This known packet level control includes sequence administration of transmitted and received packets, recording data quantity of the data portion D(DT) and the like. The DMA controller $3_{1a}$ transfers the header portion H(DT) to the memory $3_{2b}$ of the packet level control device $3_2$ via the bus 15.

The packet level control device $3_2$ carries out a known packet level control with respect to the packet header portion H(DT) of the data packet DT which is transferred to the memory $3_{2b}$, and the DMA controller $3_{2a}$ transfers the packet header portion H(DT) to the memory $30_{2b}$ of the frame level control device $30_2$.

In the frame level control device $30_2$, the disassembling/assembling part 300b2 of the packet level controller $30_{2c}$ assembles the packet header portion H(DT) transferred to the memory $30_{2b}$ from the packet level control device $3_2$ and the data portion D(DT) transferred to the memory $30_{2b}$ from the frame level control device $30_1$ via the bus 16 into the data packet DT. Thereafter, the frame level control device $30_2$ assembles the information frame I(DT) including the data packet DT assembled in the packet level controller $30_{2c}$ and sends the information frame I(CR) on the communication line $1_{21}$.

The above described process is repeated every time the information frame I(DT) is received from the communication line $1_{11}$.

When the data transfer between the communication lines $1_{11}$ and $1_{21}$ ends and an information frame I(CQ) including a disconnect request packet CQ is received from the communication line $1_{11}$, the frame level control device $30_1$ carries out a known frame level control. Thus, the information frame I(CQ) is disassembled so as to extract the disconnect request packet CQ and the disconnect request packet CQ is transferred to the packet level controller $30_{1c}$.

The packet discriminating part 300a1 of the packet level controller $30_{1c}$ discriminates the type of received packet. When the received packet is discriminated as being the disconnect request packet CQ, the DMA controller $30_{1a}$ transfers the disconnect request packet CQ to the memory $3_{1b}$ of the packet level control device $3_1$.

The packet level control device $3_1$ carries out a known packet level control with respect to the disconnect request packet CQ which is transferred to the memory $3_{1b}$ and releases the call. The DMA controller $3_{1a}$ transfers the disconnect request packet CQ to the memory $3_{2b}$ of the packet level control device $3_2$ via the bus 15.

The packet level control device $3_2$ carries out a known packet level control with respect to the disconnect request packet CQ which is transferred to the memory $3_{2b}$ and releases the call. The DMA controller $3_{2a}$ transfers the disconnect request packet CQ to the memory $30_{2b}$ of the frame level control device $30_2$.

The frame level control device $30_2$ assembles the information frame I(CQ) including the disconnect request packet CQ transferred to the memory $30_{2b}$ from the packet level control device $3_2$ and sends the information frame I(CQ) on the communication line $1_{21}$.

Next, when an information frame I(CF) including a disconnect confirm packet CF is received from the communication line $1_{21}$, the frame level control device $30_2$ disassembles the information frame I(CF) including the disconnect confirm packet CF so as to extract the disconnect confirm packet CF. The packet discriminating part 300a2 of the packet level controller $30_{2c}$ discriminates the type of the received packet. When the received packet is discriminated as being the disconnect confirm packet CF, the disconnect confirm packet CF is transferred to the packet level control device $3_2$, and the packet level control device $3_2$ transfers the disconnect confirm packet CF to the packet level control device $3_1$. The packet level control device $3_1$ transfers the disconnect confirm packet CF to the frame level control device $30_1$. The frame level control device $30_1$ assembles the information frame I(CF) including the disconnect confirm packet CF and returns the information frame I(CF) on the communication line $1_{11}$.

As a result, the set call between the communication lines $1_{11}$ and $1_{21}$ is disconnected.

As may be understood from the explanation given heretofore, the packets for the call set up and the call release are transferred via the packet level control devices $3_1$ and $3_2$, but the packets for data transfer are transferred differently. That is, only the packet header portion H(DT) of the data packet DT is transferred via the packet level control devices $3_1$ and $3_2$, and the data portion D(DT) is transferred directly from the frame level control device $30_1$ to the frame level control device $30_2$ via the bus 16. For this reason, there is no need to transfer the data portion D(DT) from the frame level control device $30_1$ to the packet level control device $3_1$, then from the packet level control device $3_1$ to the packet level control device $3_2$ via the bus 15, and finally from the packet level control device $3_2$ to the frame level control device $30_2$. Compared to the conventional system described before, the number of transfers is reduced from three to one and the transfer time can be reduced considerably.

The types of packets transferred between the communication lines $1_{11}$ and $12_1$ are not limited to those shown in FIG. 4. For example, packets RR and RNR for communication flow control may be transferred between the communication lines $1_{11}$ and $12_1$. The packet RR is a receive ready packet and the packet RNR is a receive not ready packet. But in any case, the packets other than the data packet DT are discriminated by the packet discriminating parts 300ai and transferred to the corresponding packet level control device $3_i$, where i=1, 2, ..., n. Since the packets RR and RNR do not have a data portion, these packets RR and RNR do not affect reduction of the data transfer time.

Figure 5:
FIG. 5 shows a data format of an information frame.

FIG. 5 shows a data format of the information frame I. The information frame I comprises a flag field (sequence) F, an address field A, a control field C, an information field IF, a frame check sequence FCS, and a flag field F. The flag field F at the beginning of the information frame I is used as an identifier for identifying the beginning of the information frame I. The address field A contains an address information for designating addresses of the source and destination packet mode terminals. The control field C contains a control information for line control such as receive ready and reject information. The information field IF contains packet level information and actual data. The frame check sequence FCS is a bit sequence for confirming whether or not the contents of the address field A, the control field C and the information field IF are transferred accurately. For example, a cyclic redundancy check code (CRC) is used to make the error check. The flag field F at the end of the information frame I is used as an identifier for identifying the end of the information frame I.

Figure 6:
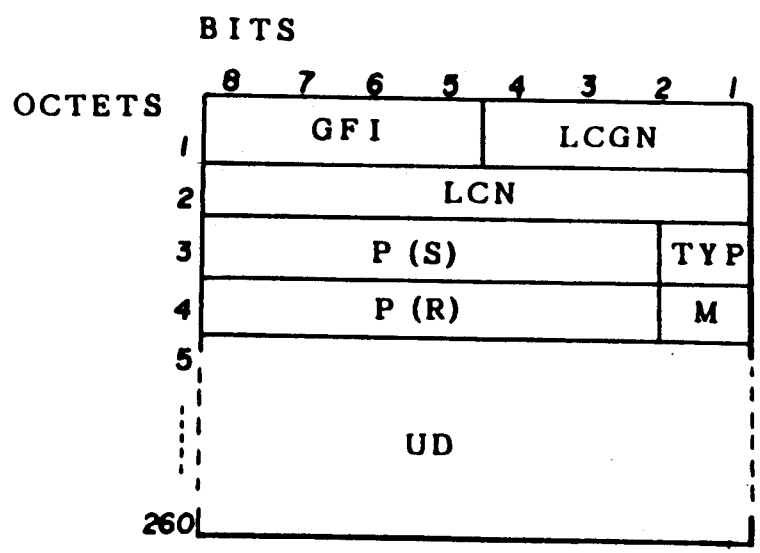
FIG. 6 shows a data format of an information field of the information frame.

FIG. 6 shows a data format of the information field IF of the information frame I. The information field IF is made up of a packet header PH and a user data UD. The packet header PH comprises a format identification information GFI, a logic channel group number LCGN, a logic channel number LCN, a transmission sequence number P(S), a packet type TYP for identifying the type of packet, a reception sequence number P(R), and a more data indicator M for indicating the continuity of the data packet. For example, the information field IF, that is, the packet is discriminated as being a data packet DT when the packet type TYP is "0".

Figure 7:
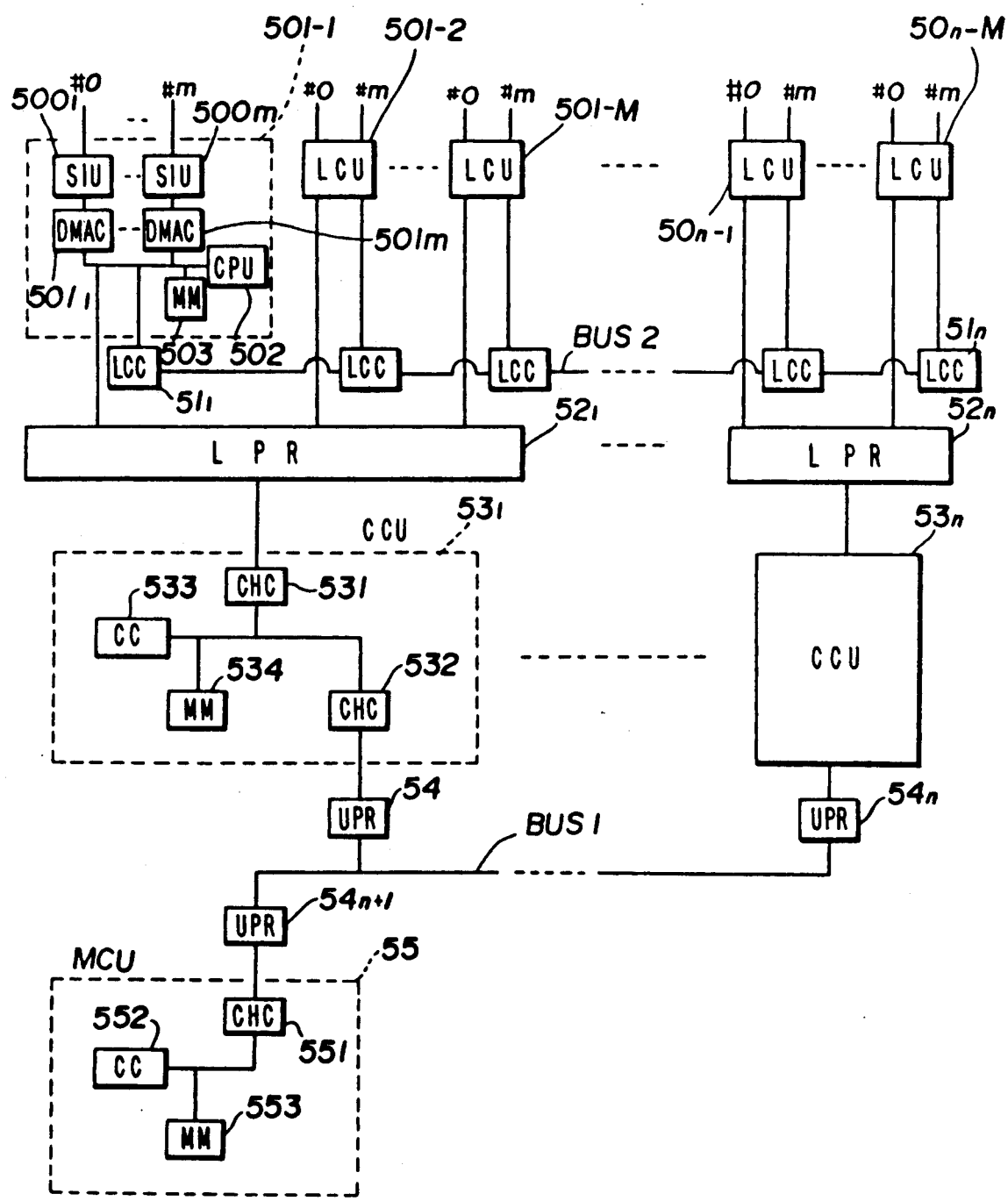
FIG. 7 is a system block diagram showing a second embodiment of the packet switching system according to the present invention.

FIG. 7 shows a second embodiment of the packet switching system according to the present invention.

The packet exchange comprises line control units (LCUs) 501-1 through 50n-M, LCU communication controllers (LCCs) $51_1$ through $51_n$, line processors (LPRs) $52_1$ through $52_n$, call control units (CCUs) $53_1$ through $53_n$, unit processors (UPRs) $54_1$ through $54_{n+1}$, and a main control unit (MCU) 55.

Each LCU 50i-k (i=1, 2, ..., n, k=1, 2, ..., M) is connected to communication lines #1 through #m and carries out a frame level control. The LCU 50i-k comprises serial interface units (SIUs) $500_1$ through $500_m$ for carrying out a line control, DMA controllers (DMACs) $501_1$ through $501_m$ for controlling a DMA transfer between a communication line and a memory, a central processing unit (CPU) 502, and a memory 503.

Each LCC $51_i$ (i=1, 2, ..., n) controls a communication between two LCUs. Each LPR $52_i$ (i=1, 2, ..., n) controls a DAM data transfer between an LCU and a CCU.

Each CCU $53_i$ (i=1, 2, ..., n) carries out a packet level control. The CCU $53_i$ comprises channel controllers (CHCs) 531 and 532, a central controller (CC) 533, and a memory 534.

Each UPR $54_i$ (i=1, 2, ..., n) controls a DMA data transfer between two CCUs. In addition, the UPR $54_{n+1}$ controls a DMA data transfer between the MCU 55 and a UPR $54_i$.

The MCU 55 carries out a call control such as a routing, and supervision and control of the system. The MCU 55 comprises a CHC 551, a CC 552, and a memory 553.

Figure 8:
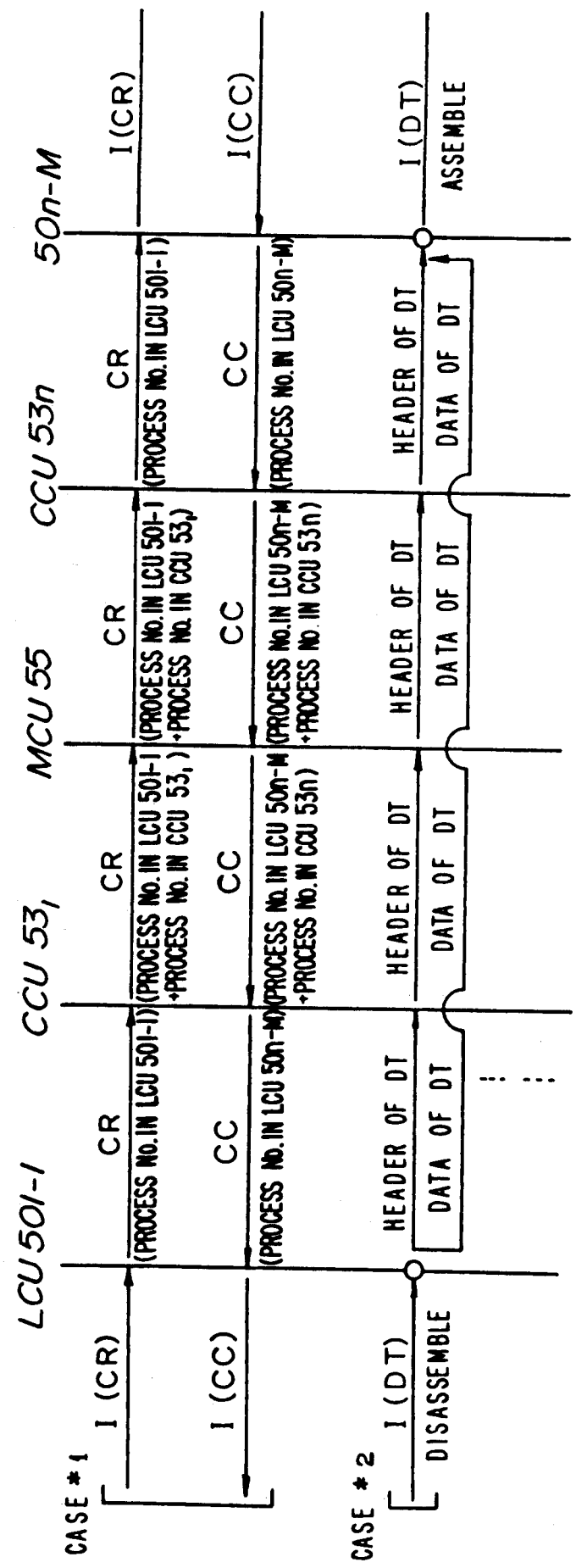
FIG. 8 is a time chart for explaining an operation of the second embodiment.

FIG. 8 is a time chart for explaining the operation of the second embodiment including the operation of confirming the destination within the packet exchange. For the sake of convenience, it is assumed that the source and destination within the packet exchange respectively are the LCUs 501-1 and 50n-M.

In FIG. 8, a case *1 shows the transfer of the frame information I(CR) including the call request packet CR from the LCU 501-1 to the LCU 50n-M, and the transfer of the frame information I(CC) including the connection complete packet CC from the LCU 50n-M to the LCU 501-1. The information transferred with the packet is shown in brackets. On the other hand, a case

*2 shows the transfer of the information frame I(DT) including the data packet DT from the LCU 501-1 to the LCU 50n-M.

The operation of the LCU 501-1, the CCU 53₁, the MCU 55, the CCU 53ₙ, and the LCU 50n-M will now be described by referring to the flow charts shown in FIGS. 9 through 13.

Figure 9:
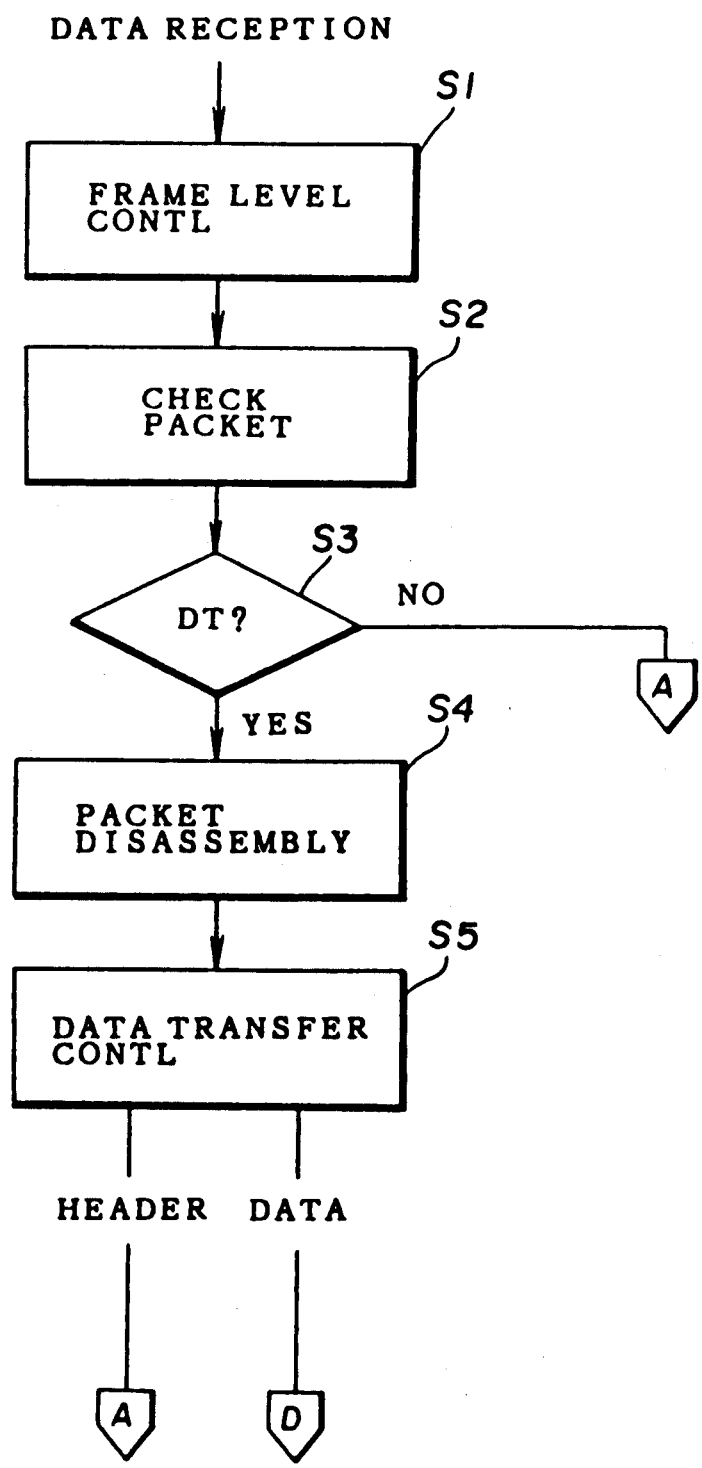
FIGS. 9 through 13 respectively show flow charts for explaining the operation of the second embodiment.

FIG. 9 shows the operation of the LCU 501-1 carried out under the control of the CPU 502. When an information frame I is received from the communication line #1 which is connected to the LCU 501-1, for example, the SIU 500₁ and the DMAC 501₁ transfer the information frame to the memory 503 under the control of the CPU 502, and the process shown in FIG. 9 is started. A step S1 carries out a known frame level control with respect to the information frame I transferred to the memory 503. A step S2 checks the type of the received packet by checking the packet type TYP within the packet header PH. A step S3 discriminates whether or not the received packet is a data packet DT. When the discrimination result in the step S3 is NO, the process advances to a step S11 shown in FIG. 10 which will be described later. On the other hand, when the discrimination result in the step S3 is YES, a step S4 disassembles the data packet DT into the packet header PH and the user data UD. When disassembling the data packet DT, an identifier (a number of the like) is added to each of the packet header PH and the user data UD so that the corresponding packet header PH and the user data UD can be assembled later. A step S5 transfers the packet header PH to the CCU 53₁ and the process advances to the step S11 on one hand, and the step S5 transfers the user data UD to the LCU 50n-M and the process advances to a step S41 which will be described later on the other.

Figure 10:
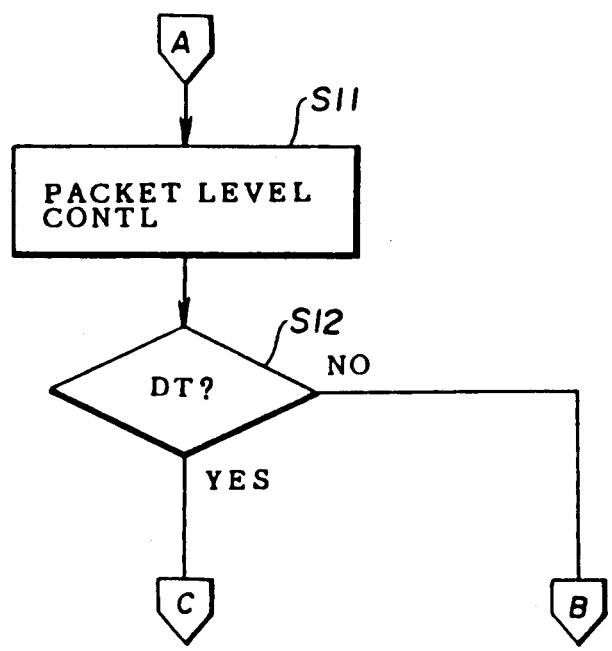

FIG. 10 shows the operation of the CCU 53₁ carried out under the control of the CC 533. The step S11 carries out a known packet level control with respect to the packet received from the LCU 501-1, including checking of the information contained in the received packet. A step S12 discriminates whether or not the received packet is a data packet DT (or the packet header PH of the data packet DT). When the discrimination result in the step S12 is NO, it is discriminated that the received packet is a packet such as the packets CR, CC, CF and CQ for call control, and the process advances to a step S21 shown in FIG. 11 which will be described later. On the other hand, when the discrimination result in the step S12 is YES, the process advances to a step S31 shown in FIG. 12 which will be described later.

Figure 11:
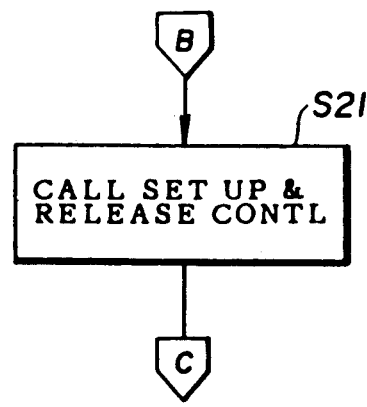

FIG. 11 shows the operation of the MCU 55 carried out under the control of the CC 552. The step S21 carries out a control of the call set up and release, including the routing of the call out request packet CR to determine the destination CCU and LCU within the packet exchange which are the CCU 53ₙ and the LCU 50n-M in this case. After the step S21, the process advances to the step S31 shown in FIG. 12.

Figure 12:
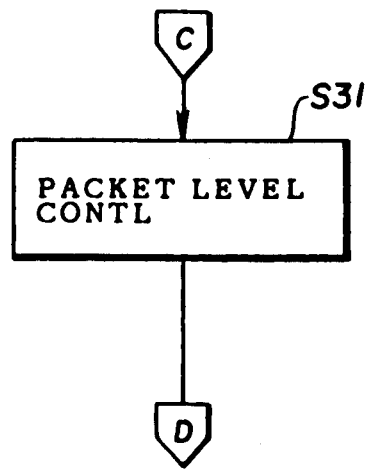

FIG. 12 shows the operation of the CCU 53ₙ carried out under the control of the CC 533. The step S31 carries out a known packet level control with respect to the received packet received from the CCU 53₁, including the generation of the transmitting packet mode and the communication flow control on the transmission side. After the step S31, the process advances to the step S41 shown in FIG. 13.

Figure 13:
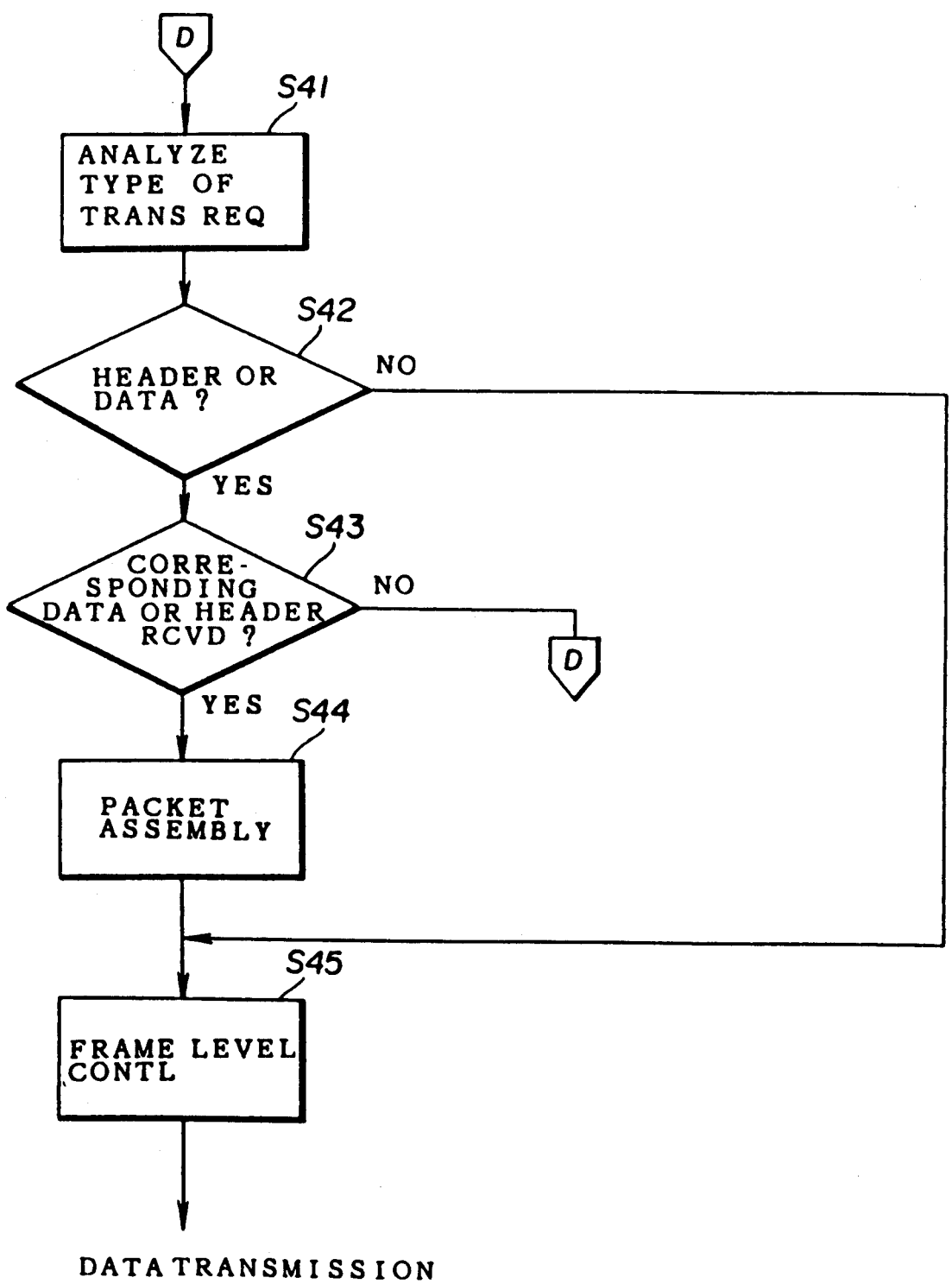

FIG. 13 shows the operation of the LCU 50n-M carried out under the control of the CPU 502. The step S41 analyzes the type of transmission request and branches the control depending on the transmission request. A step S42 discriminates whether or not the received data is the packet header PH or the user data UD of the data packet DT. When the discrimination result in the step S42 is NO, the received data (packet) is a packet for call control or a packet for communication flow control, and the process advances to a step S45. But when the discrimination result in the step S43 is YES, a step S43 discriminates whether or not the corresponding user data UD or packet header PH of the data packet DT is already received. In other words, when the packet header PH of the data packet DT is detected in the step S42, the step S43 discriminates whether or not the corresponding user data UD of the same data packet DT is received. Similarly, when the user data UD of the data packet DT is detected in the step S42, the step S43 discriminates whether or not the corresponding packet header PH of the same data packet DT is received. The process returns to the step S41 to wait for a next request when the discrimination result in the step S43 is NO. On the other hand, when the discrimination result in the step S43 is YES, a step S44 assembles the corresponding packet header PH and user data UD to restore the original data packet DT, by matching the identifiers added to these packet header PH and user data UD in the LCU 501-1. Then, the step S45 carries out a known frame level control with respect to the data packet DT, including a control of the frame level procedure on the transmission side and editing of the frame format. After the step S45, the DMAC 501₁ and the SIU 500₁ transmit the received data on the communication line #1 which is connected to the LCU 50n-M, for example, under the control of the CPU 502.

In FIG. 7, a bus BUS1 connecting the CCUs 53₁ through 53ₙ and the MCU 55 corresponds to the bus 15 shown in FIG. 3. In addition, a bus BUS2 connecting the LCUs 501-1 through 50n-M corresponds to the bus 16. The LCU 50i-k substantially corresponds to the frame level control device 30ᵢ, and the LCC 51ᵢ and the LPR 52ᵢ may be considered as a part of the frame level control device 30ᵢ. The CCU 53ᵢ substantially corresponds to the packet level control device 3ᵢ, and the UPR 54ᵢ may be considered as a part of the packet level control device 3ᵢ. The MCU 55 substantially corresponds to the system operation management device 4, and the UPR 54ₙ₊₁ may be considered as a part of the MCU 55.

Further, the present invention is not limited to these embodiments, but various variations and modifications may be made without departing from the scope of the present invention.

What is claimed is:
1. A packet switching system comprising:
   a plurality of communication lines;
   at least first and second data control means respectively connected to first and second groups of said communication lines;
   at least first and second packet control means respectively connected to said first and second data control means;
   a first bus connecting said first and second packet control means; and
   a second bus connecting said first and second data control means, said first and second data control means having identical construction and each comprising packet discriminating means for discriminating a type of packet received, packet disassembling/assembling means for disassembling a data packet into a header portion and a data portion and for assembling the disassembled header portion and data portion into the data packet, and data transfer means for controlling transfer of packets, in said first data control means said packet discriminating means discriminating the type of packet received from a communication line within said first group of communication lines which is connected to said first data control means, said packet disassembling/assembling means disassembling the received packet into a header portion and a data portion when said packet discriminating means discriminates the received packet as being a data packet, and said data transfer means transferring the header portion to said first packet control means and the data portion to said second data control means via said second bus, said first packet control means transferring the header portion to said second packet control means via said first bus, said second packet control means transferring the header portion to said second data control means, in said second data control means said packet disassembling/assembling means assembling the header portion received from said second packet control means and the data portion received via said second bus into the data packet, and said data transfer means transferring the assembled data packet on a communication line within said second group of communication lines which is connected to said second data control means.

2. The packet switching system as claimed in claim 1 wherein each packet has a header portion including a code indicative of a type of the packet, and said packet discriminating means of said first data control means discriminates the type of received packet based on the code included in the header portion of the received packet.

3. The packet switching system as claimed in claim 1 wherein said disassembling/assembling means of said first data control means includes means for adding corresponding identifiers to the disassembled header portion and data portion of the same data packet, and said disassembling/assembling means of said second data control means includes means for assembling corresponding header portion and data portion of the same data packet based on the identifiers added thereto.

4. The packet switching system as claimed in claim 1 wherein said first data control means further includes means for carrying out a frame level control with respect to each packet received from the communication line within said first group of communication lines.

5. The packet switching system as claimed in claim 1, wherein said first and second packet control means respectively include means for carrying out a packet level control with respect to the received packet from said first data control means.

6. The packet switching system as claimed in claim 1, wherein said second data control means further includes means for carrying out a frame level control with respect to the received packet from said second packet control means and each data portion received from said first data control means.

7. The packet switching system as claimed in claim 1 which further comprises a system operation management device which is connected to said first bus for controlling a total operation of said packet switching system.

8. The packet switching system as claimed in claim 1 wherein said packet disassembling/assembling means of said first data control means disassembles the received data packet into the header portion and the data portion only when said packet discriminating means of said first data control means discriminates the received packet as being the data packet, said data transfer means of said first data control means transferring packets other than the data packet to said first packet control means.

9. The packet switching system as claimed in claim 8 wherein said packets other than the data packet include packets for controlling call set up and release and packets for controlling communication flow.

10. The packet switching system as claimed in claim 1 wherein said communication lines transmit and receive data in information frames, each information frame including a first flag field for identifying a beginning of the information frame, an address field for designating addresses of source and destination packet mode terminals which are connected to the communication lines, a control field including a control information for line control, an information field including packet level information and actual data, a frame check sequence for confirming whether or not the contents of the address field, the control field and the information field are transferred accurately, and a second flag field for identifying an end of the information frame.

11. The packet switching system as claimed in claim 10 wherein said information field of said information frame is made up of a packet header and a user data, said packet header corresponding to said packet header portion, said user data corresponding to said data portion.

12. The packet switching system as claimed in claim 10 wherein said first data control means further comprises means for disassembling said information frame so as to extract said information field, said information field being supplied to said packet discriminating means of said first data control means as the received packet.

13. The packet switching system as claimed in claim 1 wherein said first and second packet control means and said first and second data control means respectively comprise memory means for temporarily storing received data.

14. The packet switching system as claimed in claim 13 wherein said first and second packet control means and said first and second data control means respectively further comprise a direct memory access controller means for controlling a data transfer from a corresponding said memory means.

* * * * *

UNITED STATES PATENT AND TRADEMARK OFFICE
CERTIFICATE OF CORRECTION

PATENT NO. : 5,010,546
DATED      : April 23, 1991
INVENTOR(S) : Masaaki Kato

It is certified that error appears in the above-identified patent and that said Letters Patent is hereby corrected as shown below:

Col. 7,   line 47, "$12_1$" s/b --$1_{21}$--;
          line 50, "$12_1$" s/b --$1_{21}$--.

Signed and Sealed this

Twenty-fourth Day of November, 1992

Attest:

DOUGLAS B. COMER

*Attesting Officer*     Acting Commissioner of Patents and Trademarks